United States Patent
Jefferies et al.

(10) Patent No.: US 9,889,760 B2
(45) Date of Patent: Feb. 13, 2018

(54) BRANCH ENERGY MANAGEMENT FOR MULTIPLE EVSES

(71) Applicant: SCHNEIDER ELECTRIC USA, INC., Schaumburg, IL (US)

(72) Inventors: Kevin M. Jefferies, Raleigh, NC (US); Benjamin W. Edwards, Rolesville, NC (US); Matthew L. White, Raleigh, NC (US); Konstantin A. Filippenko, Grenoble (FR); Richard K. Weiler, Wake Forest, NC (US)

(73) Assignee: Schneider Electric USA, Inc., Andover, MA (US)

( * ) Notice: Subject to any disclaimer, the term of this patent is extended or adjusted under 35 U.S.C. 154(b) by 96 days.

(21) Appl. No.: 15/034,196

(22) PCT Filed: Dec. 6, 2013

(86) PCT No.: PCT/US2013/073486
§ 371 (c)(1),
(2) Date: May 4, 2016

(87) PCT Pub. No.: WO2015/084385
PCT Pub. Date: Jun. 11, 2015

(65) Prior Publication Data
US 2016/0280092 A1  Sep. 29, 2016

(51) Int. Cl.
*B60L 11/18* (2006.01)
*G06Q 10/06* (2012.01)

(52) U.S. Cl.
CPC ......... *B60L 11/1844* (2013.01); *B60L 11/184* (2013.01); *B60L 11/185* (2013.01);
(Continued)

(58) Field of Classification Search
CPC .. B60L 11/1844; B60L 11/184; B60L 11/185; G06Q 10/06312
(Continued)

(56) References Cited

U.S. PATENT DOCUMENTS

| | | | |
|---|---|---|---|
| 5,028,859 A | 7/1991 | Johnson et al. | |
| 5,284,719 A * | 2/1994 | Landau | G01R 31/3655 324/427 |

(Continued)

FOREIGN PATENT DOCUMENTS

| | | |
|---|---|---|
| DE | 102013205496 | 10/2013 |
| EP | 2551987 | 1/2013 |

(Continued)

OTHER PUBLICATIONS

International Search Report and Written Opinion dated May 14, 2014 in PCT/US13/73486, 28pp.
(Continued)

*Primary Examiner* — M'Baye Diao
(74) *Attorney, Agent, or Firm* — Locke Lord LLP

(57) ABSTRACT

A distributed energy management method and system 100 are disclosed for managing a charge rate of an array of EVSEs 140 that share a common power source. In the disclosed method and system, control of the power sharing is distributed at the individual EVSE level. For example, each EVSE includes a communication device 540 and a controller 530. The communication device is used to receive a signal relating to a present current capacity utilization of the shared circuit, such as an indication of availability or unavailability of current capacity on the shared circuit. The controller is configured to generate a variable update interval, and initiate adjustment of the charge rate of the EVSE according to the variable update interval based on the present current capacity utilization as indicated by the received signal.

18 Claims, 14 Drawing Sheets

(52) U.S. Cl.
CPC ...... *G06Q 10/06312* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(58) Field of Classification Search
USPC .......................................................... 320/109
See application file for complete search history.

(56) References Cited

U.S. PATENT DOCUMENTS

| | | |
|---|---|---|
| 5,926,004 A | 7/1999 | Henze |
| 7,045,989 B2 | 5/2006 | Sakakibara et al. |
| 7,256,516 B2 | 8/2007 | Buchanan et al. |
| 7,554,292 B2 | 6/2009 | Veselic |
| 8,384,359 B2 | 2/2013 | Narel et al. |
| 8,626,372 B2 * | 1/2014 | Kumar ................ F02D 41/0097 123/406.24 |
| 2009/0230920 A1 | 9/2009 | Veselic |
| 2012/0217928 A1 | 8/2012 | Kulidijan et al. |
| 2013/0141040 A1 | 6/2013 | DeBoer et al. |
| 2013/0162221 A1 | 6/2013 | Jefferies et al. |

FOREIGN PATENT DOCUMENTS

| | | |
|---|---|---|
| JP | 2013225971 | 10/2013 |
| WO | WO2013027113 | 2/2013 |

OTHER PUBLICATIONS

Extended European Search Report for 13898658.3-1927 / 3077246 PCT/US2013073486 dated Sep. 8, 2017.

* cited by examiner

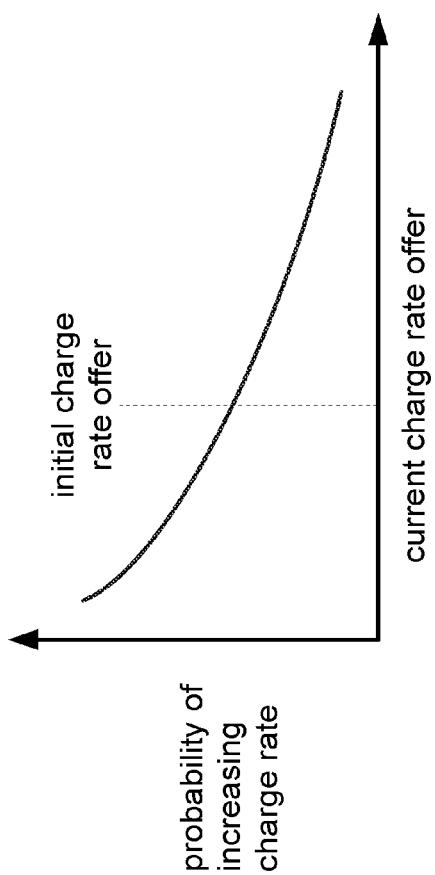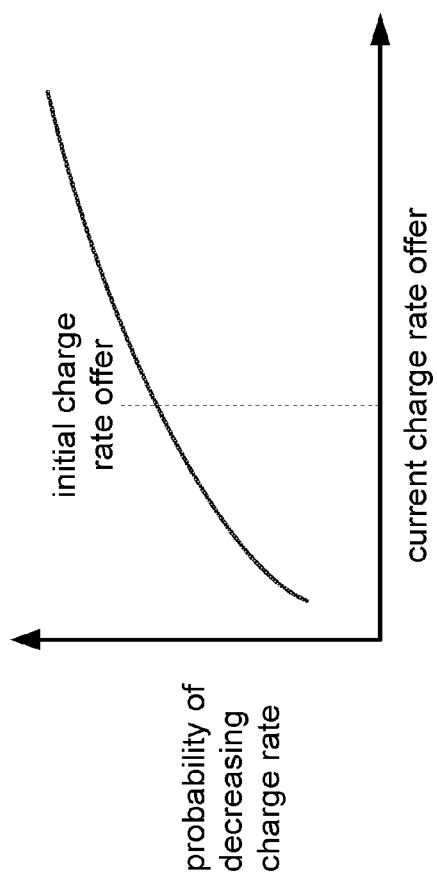

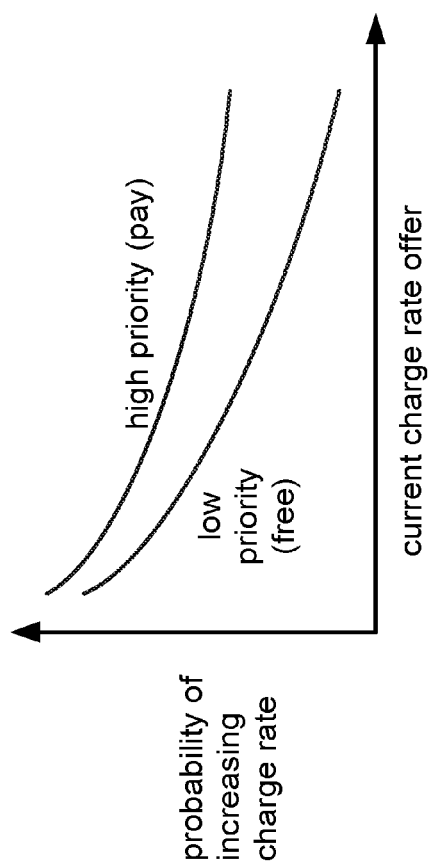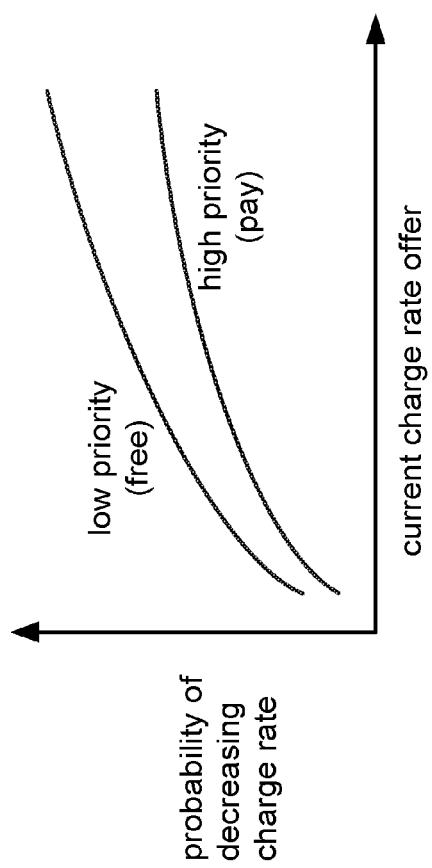

BRANCH ENERGY MANAGEMENT FOR MULTIPLE EVSES

FIELD

The present disclosure relates to electric vehicle charging systems, and, more particularly, to distributed methods and systems for managing a charge rate of an array of EVSEs that share a common power source.

BACKGROUND

With the growth of the electric vehicle (EV) industry, infrastructure is constantly being added to enable "opportunity" charging, e.g., charging in public spaces such as at parking lots in shopping centers, in city centers, and at work places. The charging infrastructure involves at least two aspects: the installation of electric vehicle supply equipment (EVSEs), and the installation of a power system (e.g., a power distribution infrastructure) to supply power to the EVSEs. An EVSE, also referred to as a charging station or an EV charging station (EVCS), supplies power from the power system to an EV in order to charge the EV's battery.

Two distinct varieties of commercial EVSEs are available: AC charging stations and DC charging stations. DC EVSEs are typically "fast charge" stations which require large amounts of power (e.g., 50 kW or more), and are typically provided by 3-phase power systems. They are the larger and more expensive variety of charging stations because they incorporate power electronics required for providing variable voltage and current as requested by the EV. AC charging stations, however, only require connection to a single phase power supply which is readily available, and are significantly less expensive as they incorporate no power electronics to condition the power provided to the EV. Based on the lower cost to own and operate, the AC charger is more common for opportunity charging applications.

As an EVSE represents a substantial load to the power system, the installation of EVSEs requires specific power system consideration. For example, local electrical codes specify requirements for connecting an EVSE to a power system. In the United States, the National Electric Code (NEC) specifies the required capacity of the power system for EVSEs. As specified by the NEC, the service providing power to an EVSE must be capable of providing power for all downstream EVSEs at maximum load simultaneously, unless an energy management system is used. For most installations, the average load from one or more EVSEs is significantly lower than the maximum load. Thus, an energy management system can be used to downsize service for an installation of EVSEs, and thus, to reduce the overall cost of installing and operating a charging infrastructure.

Traditional energy management systems, however, require the use of a central controller, and a means of addressing and querying individual EVSEs to monitor and control the charging rate at each EVSE. Systems designed around a central controller have inherent characteristics that must be addressed. For example, the central controller must be able to communicate with every EVSE individually, which adds complexity to the installation in terms of materials and labor, and complexity to the design of both the controller and the EVSEs. Further, traditional energy management systems cannot be easily updated with additional EVSEs or capabilities, or easily accommodate changes in the available capacity or variable target capacity utilization. For example, the central controller and the EVSE may need to be re-programmed or re-designed to incorporate new capabilities, to add or remove EVSEs in the system, or to address compatibility issues when updating the system.

SUMMARY

Energy management methods and systems are disclosed for managing charge rates of multiple EV charging stations (EVCS), a.k.a. electric vehicle supply equipment(s) (EVSE) (and used interchangeably herein) on an array, where the EVSEs of the array share a common power source. The EVSEs are supplied with power through a shared circuit, such as a plurality of branch circuits or sub-branch circuits that distribute power from the common power source to the EVSEs. Control of the power sharing is distributed at the individual EVSE level.

For example, in the disclosed energy management methods and systems, a capacity evaluator (also referred to as a "current capacity utilization evaluator") monitors an upstream current that reflects the current drawn by all loads including the EVSEs on the shared circuit, and compares the monitored current (i.e., current measurement) to a capacity utilization threshold to determine a present current capacity utilization of the shared circuit. The present current capacity utilization indicates an availability or unavailability of current capacity for use by the EVSEs. The capacity evaluator transmits a signal(s) relating to the present current capacity availability to the EVSEs. The signal can be transmitted continuously or periodically as a unidirectional or broadcasted signal, which is available to all of the EVSEs. The threshold can correspond to a system capacity utilization threshold (e.g., a rated current capacity or a percentage thereof for the shared circuit), or a target capacity utilization threshold (e.g., a target according to a billing rate or rate schedule). The current can be monitored continuously or periodically by the capacity evaluator to provide an updated signal of the current capacity availability of the circuit to each of the EVSEs.

Each of the EVSEs includes a communication device to receive the signal, and individually performs a decision algorithm to dynamically adjust (e.g., increase or decrease) a charge rate offered to a charging EV according to the present current capacity availability indicated by the signal. The disclosed energy management control scheme thus provides a decentralized approach which allows EVSEs to individually determine and adjust their charge rates as the load demand on the shared circuit varies, without requiring any communication between the EVSEs. Furthermore, the disclosed distributed energy management systems can be easily updated to add or remove EVSEs, to add new capabilities, and to increase or decrease the available capacity or variable target capacity utilization, without requiring communication from the EVSEs to the central capacity evaluator, and without requiring current capacity utilization data about each individual EVSE and load.

When all or multiple EVSEs on the shared circuit increase their charge rates at the same time in response to the signal relating to the present current capacity availability on the shared circuit, the drawn current on the shared circuit may increase significantly (e.g., spike) and exceed the current capacity utilization threshold of the shared circuit. To reduce instability on the shared circuit caused by the simultaneous adjustment of the charge rate by multiple EVSEs, each of the EVSEs in the array can be configured to generate a variable update interval (e.g., a random delay interval or period), and to initiate adjustment of the charge rate of the EVSE according to the variable update interval based on the present current capacity of the circuit. For example, the charge rate of the EVSE may be adjusted after a variable delay corresponding to the variable update interval if current capacity is available. As a result, there is a greater likelihood that the EVSEs on the shared circuit will implement the charge rate adjustment operations of the decision algorithm, such as to receive (e.g., sample) and evaluate the signal and to initiate adjustment of their charge rates, at different times during their charging sessions. Furthermore, the asynchronous implementation of the charge rate adjustment operations of the decision algorithm between EVSEs also reduces the possibility that any individual EVSE will monopolize the current drawn from the shared circuit or will draw very little or no current from the shared circuit.

In accordance with a further embodiment, each of the EVSEs may further determine whether to adjust the charge rate according to additional adjustment parameters associated with an EVSE, its charging EV, or the EVSE users. The adjustment parameters may include a charge rate priority of the EVSE. For example, preferential treatment may be given to an EVSE, such as based on a user loyalty program, nature of the user (e.g., paying or free), model or brand of the EV, or other preferential factors related to the EV charging its battery through the EVSE. The adjustment parameters may also include other parameters, such as a present charge rate of the EVSE in relation to an initial charge rate during the charging session, or charge transaction factors, such as a present charging duration of the EVSE or an amount of energy already drawn by the EVSE during the charging session. When current capacity is limited, these other parameters can be used to provide a fairer and more equitable approach to current capacity utilization distribution on a shared circuit by multiple EVSEs. Furthermore, the decision to adjust the charge rate can be a probabilistic determination, which is weighted according to any of these adjustment parameters. For example, probability curves for increasing or decreasing a charge rate may be provided for each of the adjustment parameters.

Furthermore, in another embodiment, the energy management system may also respond to capacity utilization or an energy contract on a site level versus only on a branch level basis (e.g., on the level of the circuit managed by the EVSE charge management system). For example, a site can include a power distribution infrastructure that includes a plurality of branch and sub-branch circuits, including the shared circuit which is a branch or sub-branch that supplies power to the array of EVSEs. A current measurement can be taken upstream at a site origin, which reflects the current drawn by all loads at the site. The current measurement for the site can be compared to a site capacity utilization threshold to determine an availability or unavailability of current capacity utilization on a site level. The capacity utilization threshold of the site can be based on a system capacity for the site or target capacity utilization (e.g., rate schedule or an energy contract). The capacity evaluator can determine a present current capacity based on the availability or unavailability of current capacity on a branch level (e.g., the shared circuit) and/or on a site level, and transmit a signal reflecting this determination. For example, the present current capacity may reflect available current capacity if the current capacity is available at the branch level or the site level or both the branch and site level.

BRIEF DESCRIPTION OF THE DRAWINGS

The description of the various exemplary embodiments is explained in conjunction with the appended drawings, in which:

FIGS. 12A and 12B illustrate weighted probability curves for increasing or decreasing, respectively, a charge rate according to a present charge rate in relation to an initial charge rate offered to the EV by the EVSE at the beginning of the charging session.

FIGS. 13A and 13B illustrate weighted probability curves for increasing or decreasing, respectively, a charge rate according to a priority of the EVSE (or its charging EV or EVSE user).

DETAILED DESCRIPTION

Figure 1:
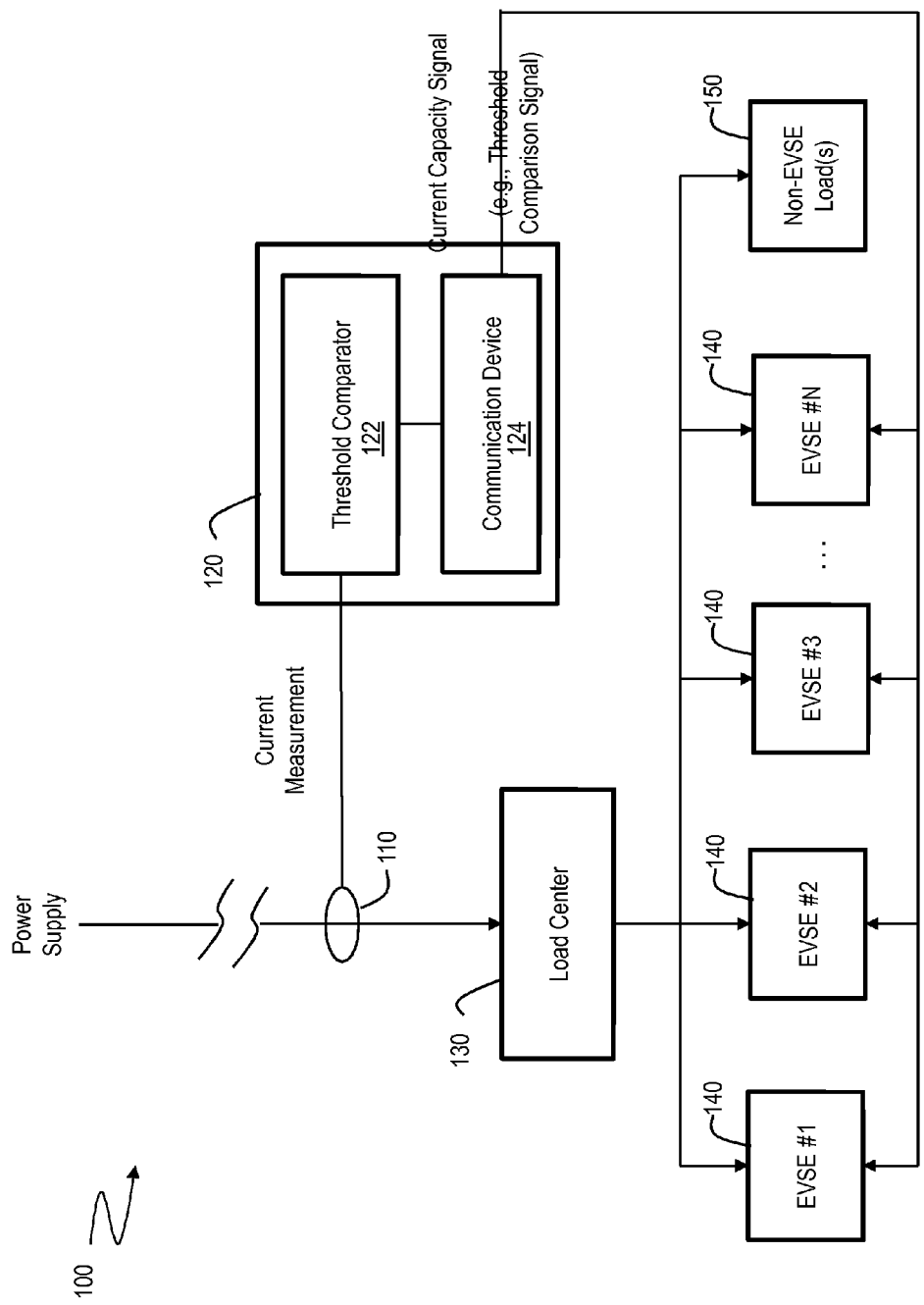
FIG. 1 illustrates a block diagram of an exemplary distributed energy management system for managing charge rates of an array of EVSEs that share a common power source, in accordance with a disclosed embodiment.

FIG. 1 illustrates a block diagram of an exemplary distributed energy management system 100 for managing charge rates of an array of EVSEs 140 that share a common power source, in accordance with an embodiment. The distributed energy management system 100 includes a load center 130 through which power is supplied via a shared circuit to a plurality of loads, such as the array of EVSEs 140 and non-EVSE load(s) 150, from a common power source.

The distributed energy management system 100 also includes a capacity evaluator 120, which monitors a current using a current sensor or sensing circuitry 110 at a branch origin, such as at the load center 130 or at a point where power is distributed on the shared circuit to the EVSEs 140 and non-EVSE load(s) 150. The capacity evaluator 120 includes a threshold comparator 122 and a communication device 124, and may also include a controller (e.g., a microcontroller(s), microprocessor(s) or control circuitry) for controlling the components and operations of the capacity evaluator 120.

The threshold comparator 122 compares the current measurement at the branch origin to a capacity utilization threshold, and outputs information relating to a present current capacity on the shared circuit. For example, the information output by the threshold comparator 122 reflects an availability or unavailability of current capacity on the shared circuit. The output may take the form of a high or low signal (e.g., a single bit output of 1 or 0, respectively). An example of the components of the threshold comparator 122 is shown in FIG. 2 and discussed further below in detail.

The capacity evaluator 120 transmits, via the communication device 124, the outputted results from the threshold comparator 122 as a signal which relates to the present current capacity on the shared circuit. The signal (and updates thereof) can be transmitted continuously or periodically as a broadcast signal, or at the request of an EVSE using unidirectional or bidirectional communications. The communications between the capacity evaluator 120 and the EVSEs 140 can be conducted via line-based or wireless communications, as generally shown by reference 160. When conducting unidirectional communications from the capacity evaluator 120 to the EVSEs, the communication connection can be implemented using a simple voltage or current loop signal, a field bus implementing a communication protocol, or a wireless broadcast.

The EVSEs 140 in the array can receive the signal relating to the present current capacity on the shared circuit, and can individually adjust their charge rate accordingly. For example, each EVSE 140 can increase the charge rate offered to a charging EV if the signal indicates available current capacity on the shared circuit, or decrease the charge rate offered to the charging EV if the signal indicates unavailable current capacity on the shared circuit.

Figure 2:
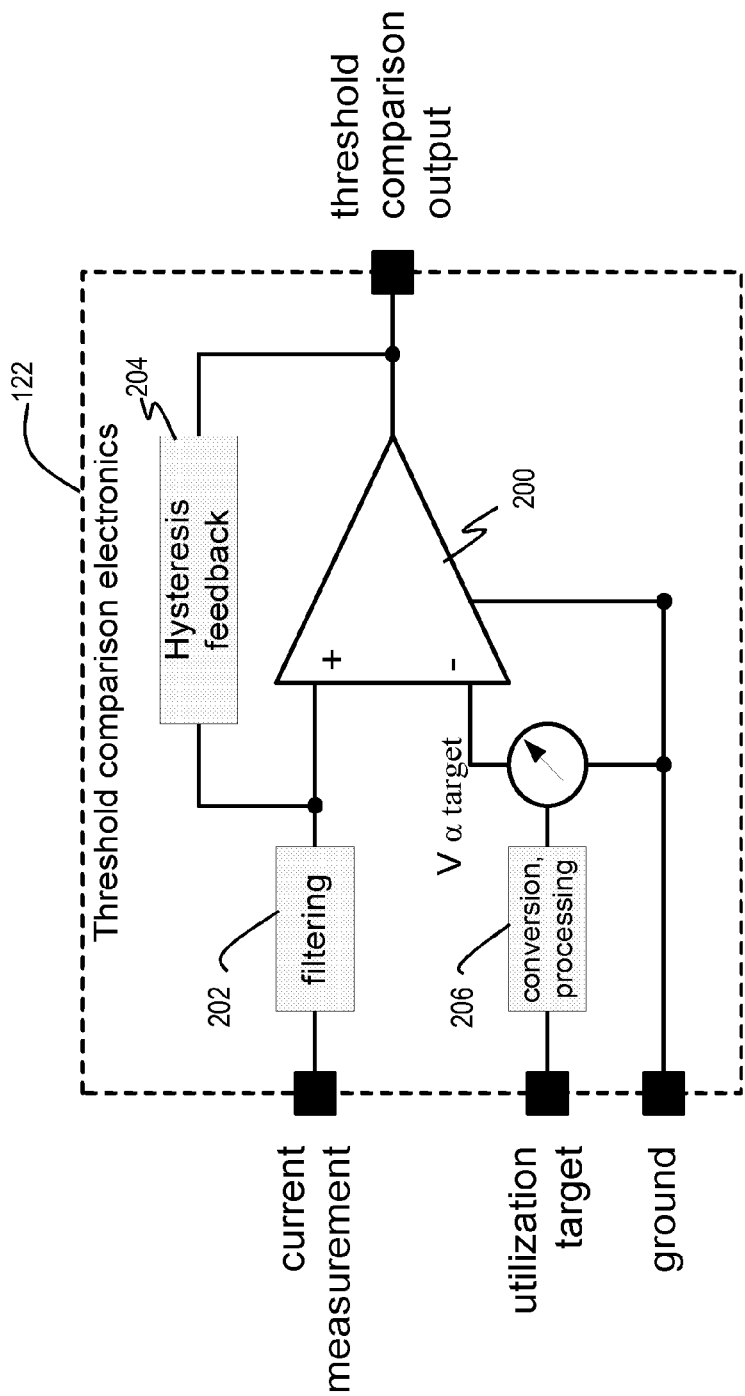
FIG. 2 illustrates a block diagram of an exemplary threshold comparator of the distributed energy management system of FIG. 1, in accordance with a disclosed embodiment.

FIG. 2 illustrates a block diagram of an exemplary threshold comparator 122 of FIG. 1, in accordance with an embodiment. The threshold comparator 122 includes a comparison circuit 200, such as an operational amplifier, with two inputs and an output. The threshold comparator 122 can also include other circuits and components such as a filter 202 for filtering signals and a feedback circuit 204 for hysteresis, if desired, to reduce spurious changes in the output of the threshold comparator 122. The conversion and processing block 206 can, for example, include a storage (e.g., a memory) and output for a target capacity utilization schedule, a digital-to-analog translator (e.g., a translation from a digitally communicated target to an analog control), and/or a filter for filtering an analog input signal.

In the example of FIG. 2, the threshold comparator 122 compares two inputs, e.g., a first input and a second input. The first input is the current measurement at the branch origin, which reflects the current drawn by all loads including the array of EVSEs 140 at a branch level (e.g., on the shared circuit). The second input is a capacity utilization threshold, such as a system capacity utilization threshold or a target capacity utilization threshold. The threshold comparator 122 outputs a signal reflecting an availability of current capacity if the current measurement does not exceed the capacity utilization threshold, or a signal reflecting an unavailability of capacity if the current measurement exceeds or is equal to the capacity utilization threshold. The output may be a single bit, e.g., 1 or 0 or high or low signal, reflecting either an unavailability or availability of current capacity.

The capacity utilization threshold can be a fixed threshold or a variable threshold (e.g., V α threshold). The system capacity utilization threshold can be set at a percentage of the maximum power system capacity for the circuit supplying power to the array of EVSEs, e.g., 90% of the upstream wiring protection device rating of the system capacity. The target capacity utilization threshold can be varied according to a schedule of target capacity utilization based on billing rates, or as a continuous input provided by a meter or building management system which retrieves the billing rate information from the utility or owner. In this way, the energy management system 100 can respond to variable capacity utilization targets in addition to the fixed limit of installed system capacity.

Figure 3:
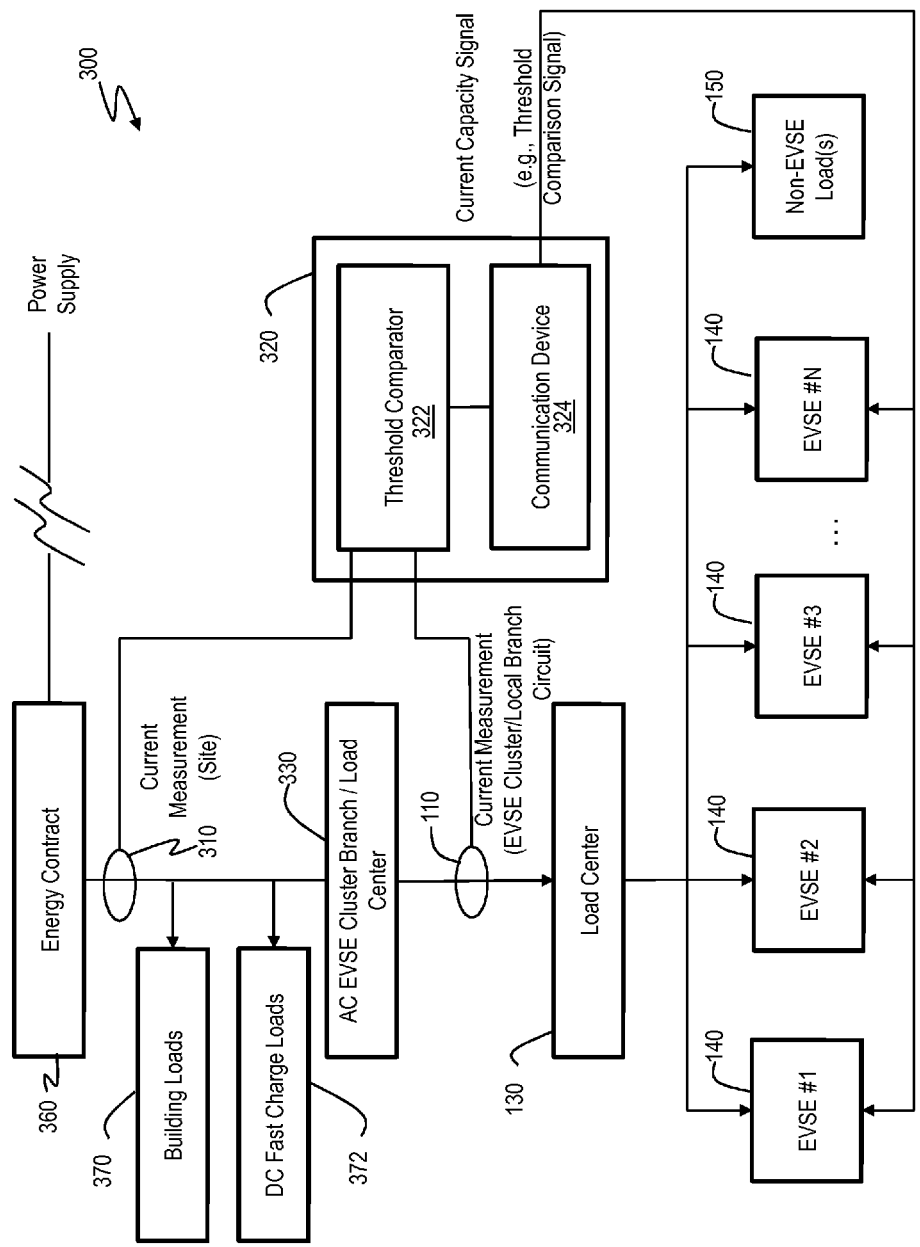
FIG. 3 illustrates a block diagram of an exemplary distributed energy management system for managing charge rates of an array of EVSEs that share a common power source, in accordance with another disclosed embodiment.

FIG. 3 illustrates a block diagram of an exemplary distributed energy management system 300 for managing charge rates of an array of EVSEs 140 that share a common power source through a shared circuit, in accordance with another embodiment. In this example, the energy management system 300 manages charge rates of the array of EVSEs 140 not only according to a state of the current capacity at the branch level (e.g., such as at the shared circuit level supplying power to the array of the EVSEs 140 of FIG. 1) but also according to a state of the current capacity at a site level that encompasses multiple branches or branch levels of the power system.

As shown in FIG. 3, the energy management system 300 includes a power system (e.g., a power distribution infrastructure) that has multiple branches that supply power to a plurality of loads. For example, power is supplied to the site at a site origin 360 subject to an energy contract. The power is distributed to different loads, such as Building loads 370, DC Fast Charge Loads 372 and AC EVSE Cluster Branch/Load Center 330. The load center 330 supplies AC power downstream to a load center 130, which in turn distributes power through a shared circuit (e.g., branch or sub-branch circuits) to a plurality of loads, such as the EVSEs 140 (where N is the number of EVSEs) and non-EVSE load(s) 150.

The energy management system 300 also includes a capacity evaluator 320, which monitors a current (e.g., a branch current) using a current sensor or sensing circuitry 110 at a branch origin, such as at the load center 130 or at a point where power is distributed on the shared circuit to the EVSEs 140 and non-EVSE load(s) 150. The capacity evaluator 320 also monitors a current (e.g., a site current) using a current sensor or sensing circuitry 310 at a site origin, such as at a point where power is supplied to the site or metered for the site and distributed downstream to the various branches, sub-branches and loads. The capacity evaluator 320 includes a threshold comparator 322 and a communication device 324, and may also include a controller (e.g., a microcontroller(s), microprocessor(s) or control circuitry) for controlling the components and operations of the capacity evaluator 320. In an exemplary embodiment, as with the system of FIG. 1, the threshold comparator 322 compares the current measurement at the branch origin to a capacity utilization threshold for the shared circuit, and outputs information relating to the current capacity for the shared circuit, which supplies power to the array of EVSEs 140 and non-EVSE load(s) 150. The threshold comparator 322 further compares the current measurement at the site origin to a capacity utilization threshold for the site, and outputs information relating to the current capacity for the site. The threshold comparator 320 outputs the state of the present current capacity based on the availability or unavailability of current capacity on the branch level (e.g., on the shared circuit) and the site level. For example, the present current capacity availability reflects available current capacity if the current capacity is available at both the branch level and at the site level. An example of the threshold comparator 322 is shown in FIG. 4, which is discussed further below in detail.

The capacity evaluator 320 transmits a signal, via the communication device 324, which reflects the present current capacity availability to the EVSEs 140 according to the output from the threshold comparator 322. As previously discussed with respect to the system of FIG. 1, the signal (and updates thereof) can be transmitted continuously or periodically as a broadcast signal, or at the request of an EVSE using unidirectional or bidirectional communications. The communication between the capacity evaluator 120 and the EVSEs 140 can be conducted via line-based or wireless communications, as generally shown by reference 160.

The EVSEs 140 in the array can receive the signal relating to the present current capacity availability, and can individually adjust their charge rate accordingly. For example, each EVSE 140 can increase the charge rate offered to a charging EV if the signal indicates available current capacity on the shared circuit and/or the site, or decrease the charge rate to the charging EV if the signal indicates that unavailable current capacity on the shared circuit and/or the site.

Figure 4:
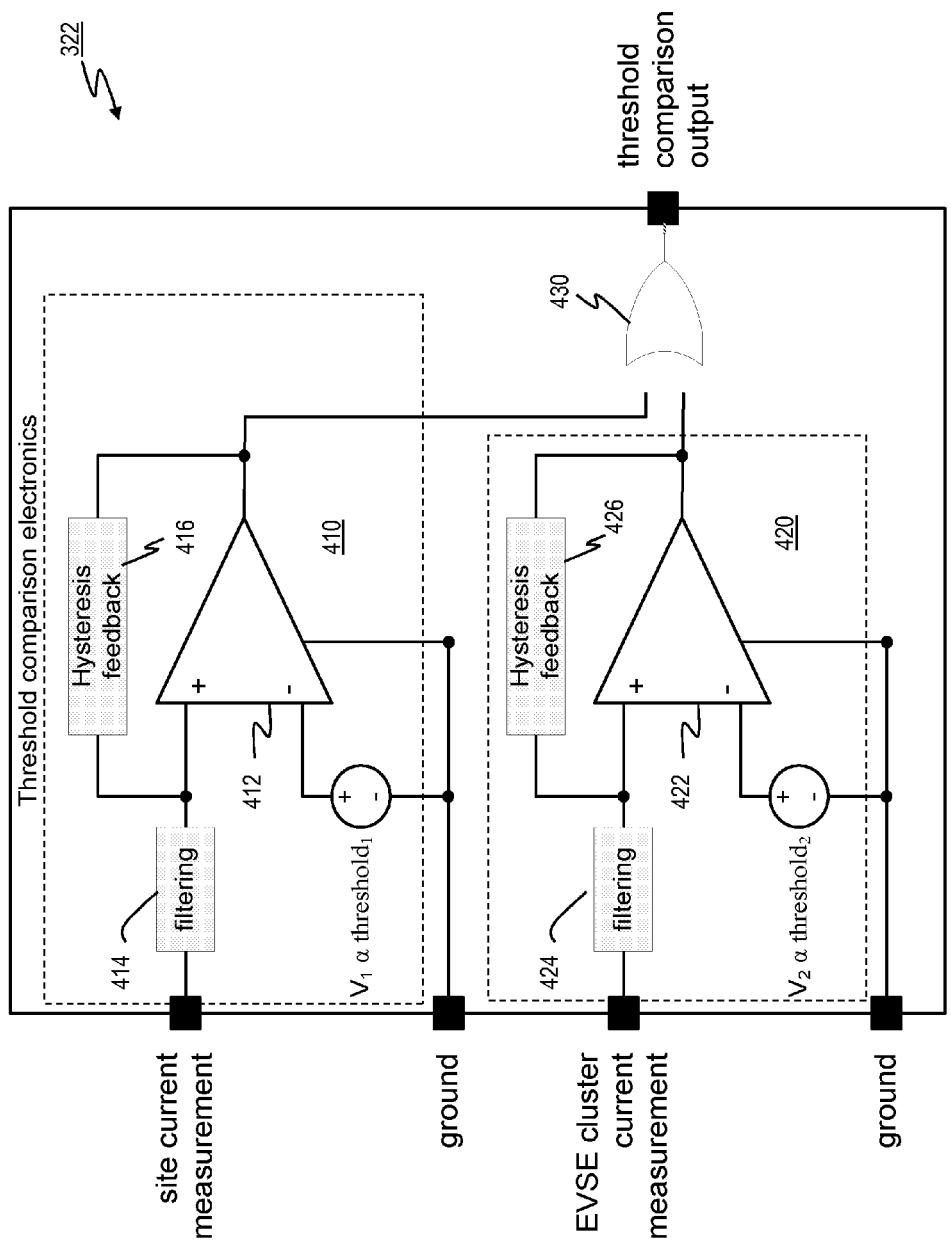
FIG. 4 illustrates a block diagram of an exemplary threshold comparator of the distributed energy management system of FIG. 3, in accordance with a disclosed embodiment.

FIG. 4 illustrates a block diagram of an exemplary threshold comparator 322 of the energy management system 300 of FIG. 3, in accordance with an embodiment. The threshold comparator 322 can include two threshold comparators, such as comparators 410 and 420, and an OR logic circuit. The threshold comparator 322 may also include signal conditioning circuitry, and memory for storing data, such as threshold data.

The comparator 410 is used to determine an availability of current capacity for the site. The comparator 410 includes a comparison circuit 412, such as an operational amplifier, with two inputs and an output. The comparator 410 can also include other circuits and components such as a filter 414 for filtering signals and a feedback circuit 416 for hysteresis, if desired, to reduce spurious changes in the output of the comparator 410. The comparator 410 compares two inputs, e.g., a first input and a second input. The first input is the current measurement at the site origin (e.g., the measured site current), which reflects the current drawn by all loads on all branches and sub-branches on the site. The second input is a capacity utilization threshold, such as a system capacity utilization threshold or a target capacity utilization threshold for the site. The comparator 410 outputs a signal reflecting an availability of capacity at the site level if the current measurement does not exceed the capacity utilization threshold, or a signal reflecting an unavailability of capacity at the site level if the current measurement exceeds or is equal to the capacity utilization threshold. The output may be a single bit, e.g., 0 or 1 or low and high, reflecting either an availability or unavailability of current capacity on the site. The capacity utilization threshold for the site can be a fixed or variable threshold, such as a system capacity utilization threshold or a target capacity utilization threshold (e.g., a threshold based on an energy contract or billing rates for the site). For example, an energy contract may set future rates according to present power usage metrics. Thus, a target capacity utilization threshold can be set to optimize future rates, as well as to meet system capacity limitations.

The comparator 420 is used to determine an availability of current capacity at a branch level for the shared circuit that supplies power to the EVSEs. The comparator 420 includes a comparison circuit 422, such as an operational amplifier, with two inputs and an output. The comparator 420 can also include other circuits and components such as a filter 424 for filtering signals and a feedback circuit 426 for hysteresis, if desired, to reduce spurious changes in the output of the comparator 420. The comparator 420 compares two inputs, e.g., a first input and a second input. The first input is the current measurement at the branch origin (e.g., the measured branch current), which reflects the current drawn by all loads on the shared circuit. The second input is a capacity utilization threshold, such as a system capacity utilization threshold or a target capacity utilization threshold for the shared circuit. The comparator 410 outputs a signal reflecting an availability of capacity at the branch level if the current measurement does not exceed the capacity utilization threshold, or a signal reflecting an unavailability of capacity at the branch level if the current measurement exceeds or is equal to the capacity utilization threshold. The output may be a single bit, e.g., 0 or 1 or low and high, reflecting either an availability or unavailability of capacity on the shared circuit. The capacity utilization threshold for the shared circuit can be a fixed or variable threshold, e.g., a system capacity utilization threshold or a target capacity utilization threshold, such as previously discussed with reference to the threshold comparator 122 of FIG. 2.

The OR logic circuit 430 receives as inputs the outputs from the comparators 410 and 420, which reflect capacity availability at the site level and the branch level, respectively. The output of the OR logic circuit 430 provides the state of the present current capacity. The output of the OR logic circuit 430 is true if either outputs from the comparators 410 and 420 are true (e.g., 1 or high signal). A high signal state from comparators 410 or 420 reflects unavailability of capacity on the site and/or branch level, or a current measurement at the appropriate branch circuit level exceeding the associated capacity utilization threshold. With an OR logic circuit, the present current capacity reflects an unavailability of current capacity if capacity is unavailable either at the site level or the branch level. In other words the OR logic circuit reflects present current capacity availability with a low signal state only if capacity is available at both the site level and branch level, according to a low signal state output from both comparators 410 and 420, respectively.

Figure 5:
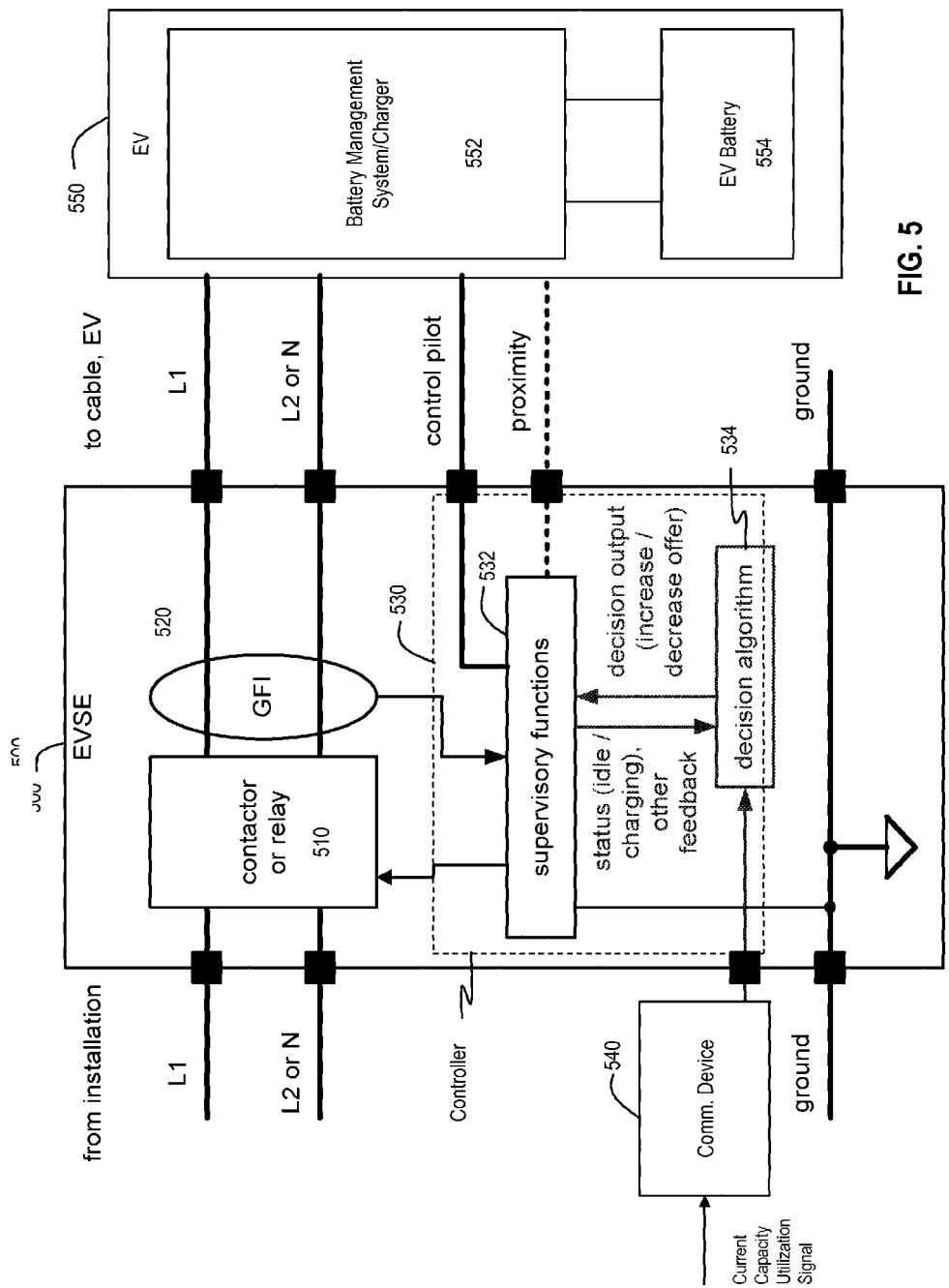
FIG. 5 illustrates a block diagram of exemplary components of an AC EVSE and EV.

FIG. 5 illustrates a block diagram of exemplary components of an EVSE 500, such as an EVSE 140 of FIG. 1, and a charging EV 550. As shown in FIG. 5, the EV 550 includes a battery 554 and a battery charger 552 for charging the battery 554. The EVSE 500 includes a contactor or relay 510, a ground fault interrupter (GFI) 520 (e.g., a ground fault circuit interrupter (GFCI)), a controller 530, a communication device 540, and other components (e.g., memory) in order to facilitate charging of the battery 554 of the charging EV 550 during a charging session. The electrical service conductors or wires, such as L1 and L2 or N (Neutral), of the power system are connected to the relay 510 and the GFI 520 of the EVSE 500. Through an EV connector of the EVSE 500 (e.g., a cable with an electrical plug-in connector), the electrical service conductors L1 and L2 or N from the EVSE 500 as well as other communication lines can then be connected to the charger 552 and other components of the EV 550 and a charging session can be initiated to charge the battery 554 of the EV 550.

The communication device 540 can be a transceiver, which receives and transmits signals using wire-line or wireless communications. For example, as discussed herein, the communication device 540 is used to receive a signal relating to the present current capacity of the power system. As previously discussed, the signal can be transmitted by a remotely located device, such as the capacity evaluator 120 of FIG. 1 or 320 of FIG. 3. In various embodiments, the signal can be transmitted as a unidirectional or broadcasted signal, which is received by the communication device 540 via a simple voltage or current loop signal, a field bus implementing a communication protocol, or a wireless broadcast.

Figure 7:
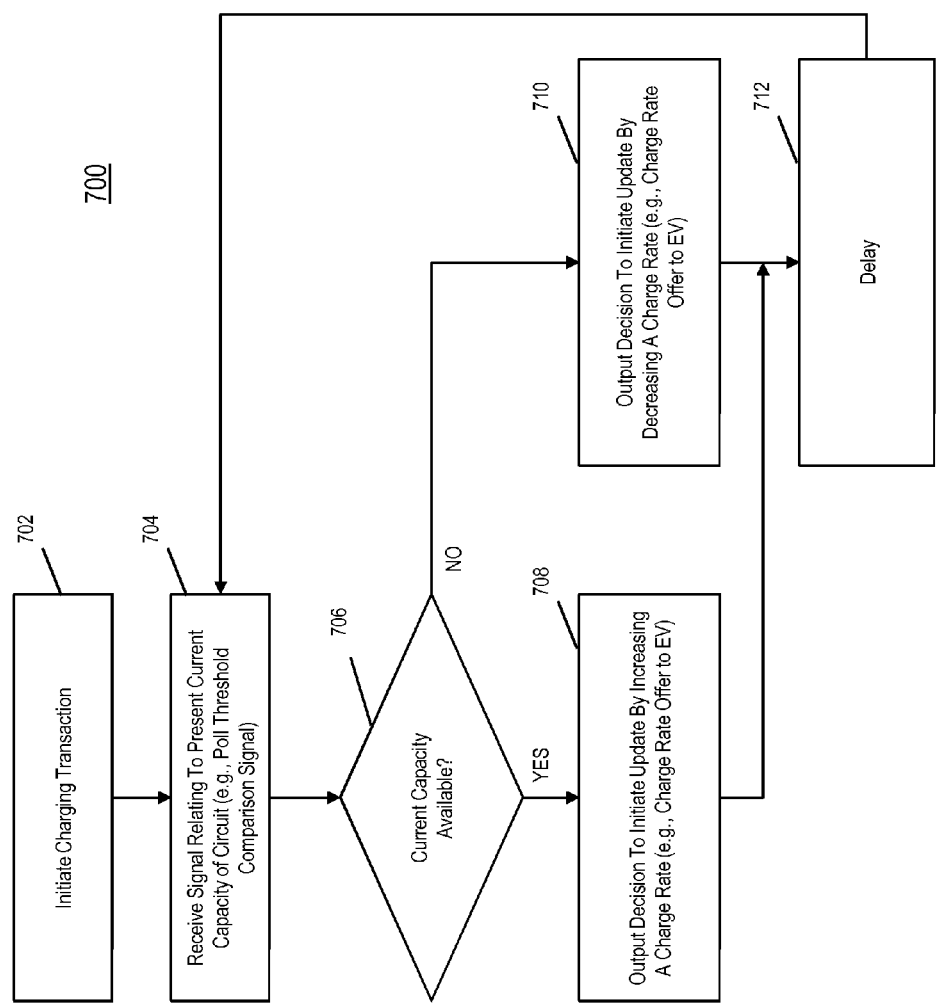
FIG. 7 illustrates a flow diagram of an exemplary charge rate adjustment procedure for an EVSE, in accordance with a disclosed embodiment.
Figure 10:
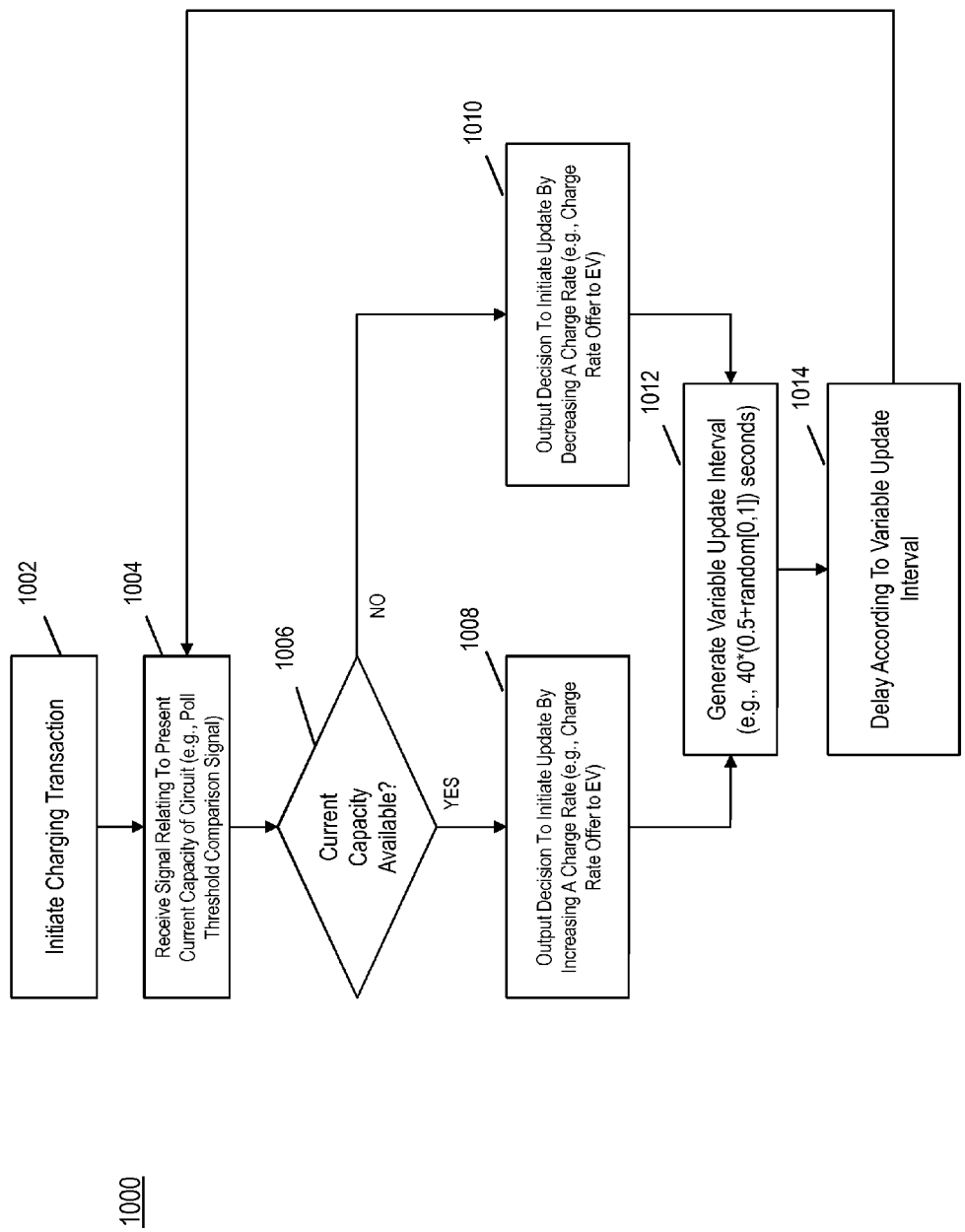
FIG. 10 illustrates a flow diagram of an exemplary charge rate adjustment procedure for an EVSE which incorporates a variable update interval, in accordance with a disclosed embodiment.
Figure 11:
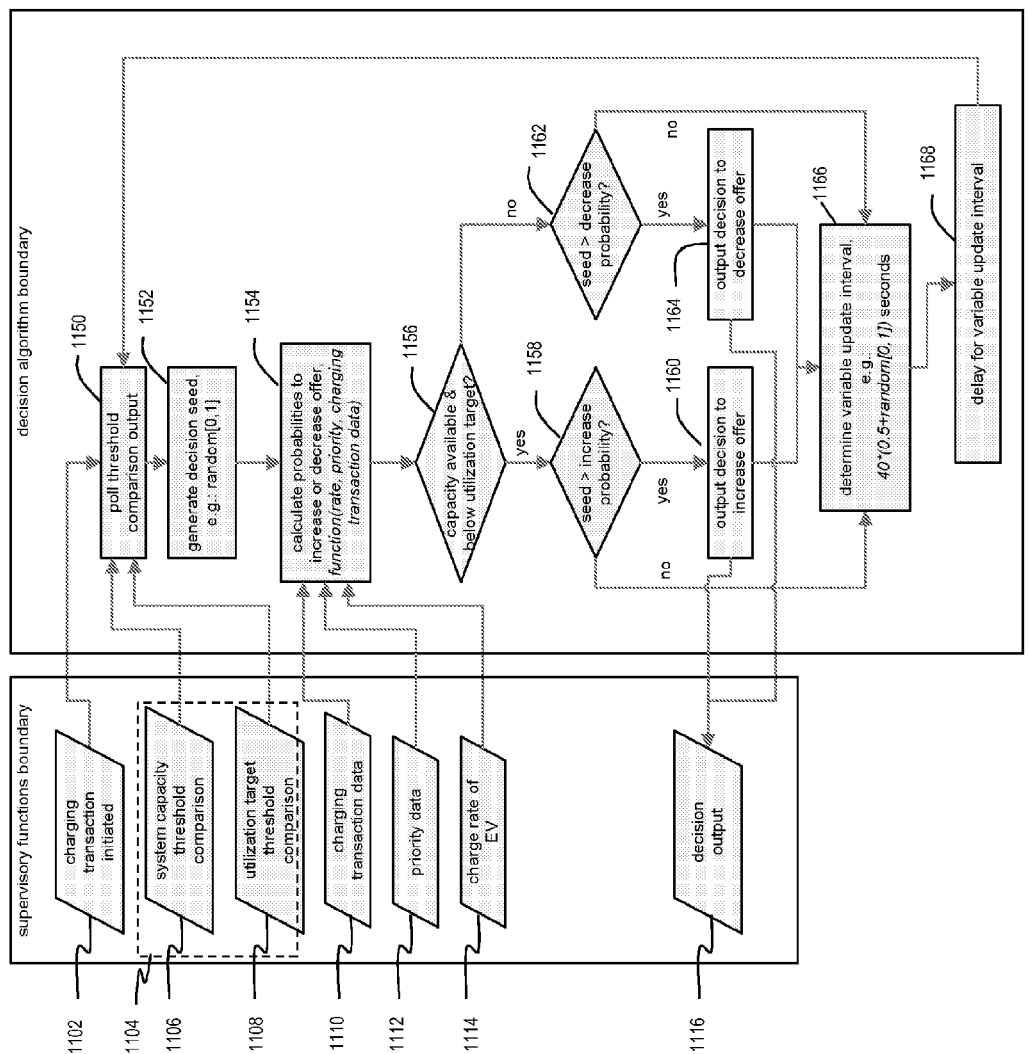
FIG. 11 illustrates a flow diagram of an exemplary charge rate adjustment procedure for an EVSE which incorporates a variable update interval, in accordance with another disclosed embodiment.

The controller 530 can be a microcontroller(s), microprocessor(s) or other control circuitry such as an ASIC or FPGA, and may include a memory to store data and computer executable programs or codes, which when executed, may control among other things the components and operations of the EVSE 500. The controller 530 is configured to implement the decision algorithm, such as the charge rate adjustment processes such as shown in FIGS. 7, 10 and 11 (described below). Various operations or functions by the controller 530 may be separated into two tiers or categories, e.g., supervisory functions 532 and decision algorithm 534. For example, the supervisory functions 532 may control the components of the EVSE and the primary operations of the EVSE 500, such as initiating the decision algorithm 534 to decide whether to increase or decrease the charge rate offered to the EV 550. The supervisory functions 532 may also obtain information for use by the decision algorithm 534. For example, the supervisory functions 532 may receive (e.g., sample) the signal relating to the present current capacity of the power system via the communication device 540, and obtain charge rate adjustment parameters, such as data on the charging transaction (e.g., a charging duration or an amount of energy drawn by the EVSE 500 or its charging EV 550 during the charging session), the present charge rate of the EVSE 500 (or its charging EV 550), and/or the priority of the EVSE 500 (or its charging EV 550). The supervisory functions may control communications with the EV 550, such as through the control pilot signal and proximity signal as set forth in the Society of Automotive Engineers (SAE)'s J1772 Standard (also referred to as the "SAE J1772 Standard"). As discussed herein, the control pilot signal can be used by the EVSE 500 to control and update the maximum charge rate permitted for use by the charger 552 to charge the EV's battery 554. Although the decision algorithm 534 is shown as being performed under control of the supervisory functions 532 of the controller 530, the decision algorithm 534 may be performed by a separate controller(s) of the EVSE 500.

Figure 6:
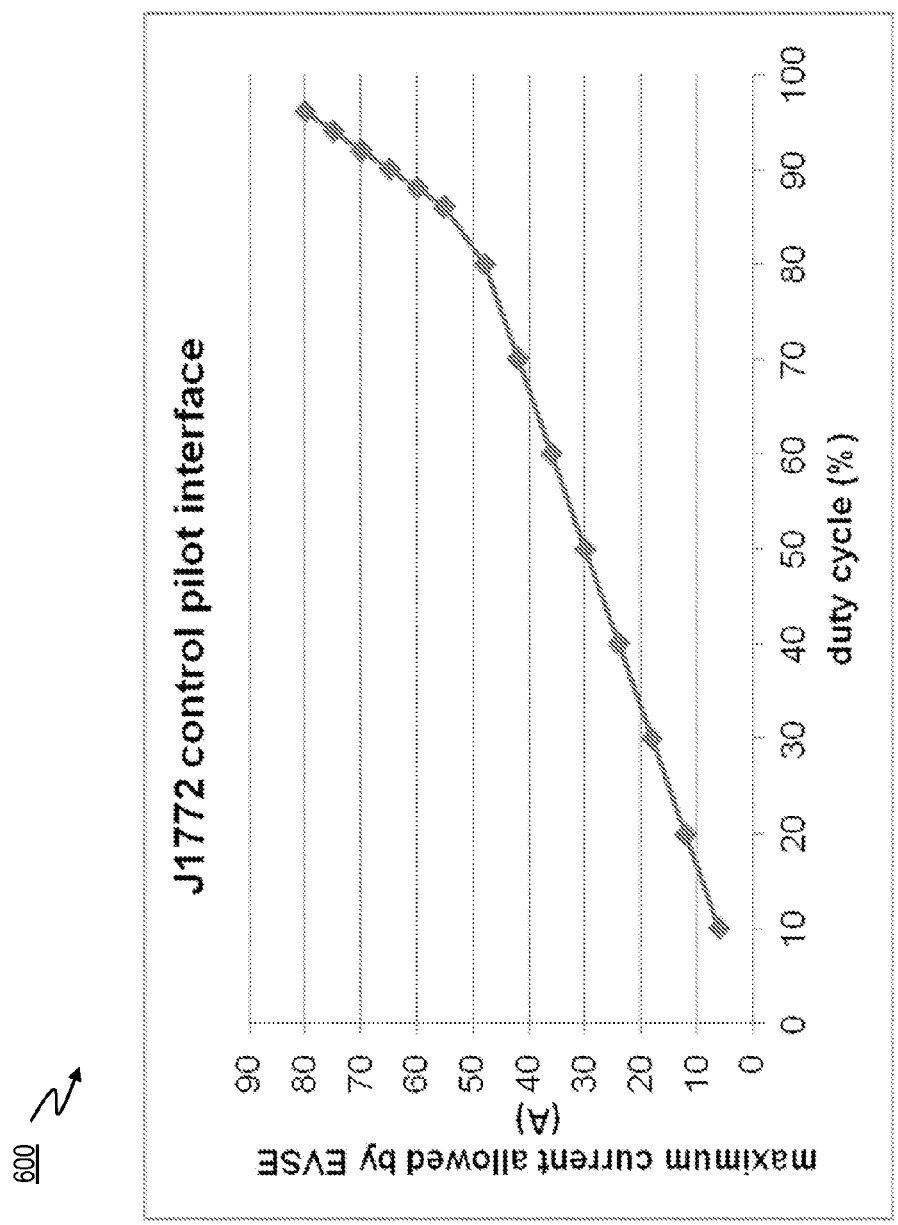
FIG. 6 illustrates a profile of a control pilot signal which may be used by an AC EVSE conforming to SAE J1772 to inform the EV to update or adjust its charge rate.

FIG. 6 illustrates a profile of a control pilot signal, such as the control pilot signal as set forth in the SAE J1772 Standard. Under the SAE J1772 Standard, the EVSE can use the control pilot signal to limit the maximum charge rate used by the battery charger of the EV, such as for AC Level 1 or Level 2 charging systems. The control pilot signal is also used to enable the EVSE to sense a connection to the EV, and to enable the EV to request the EVSE to provide mains power for charging.

As shown in FIG. 6, the duty cycle of the control pilot signal waveform set by the EVSE (such as by its supervisory functions) informs the charging EV of the charge rate that the EV battery charger (e.g., the vehicle on-board charging electronics) is allowed to draw from the EVSE. For example, as shown in FIG. 6, a duty cycle of 50% on the control pilot signal allows the EV to draw a maximum allowed current of 30 Amps. The control pilot signal is required to ensure that the EV does not draw current beyond the limitation of the EVSE design and installation. For example, a 16 Amp and 32 Amp EVSE are otherwise identical to the EV as seen from the interface through the charging plug (e.g., the plug-in connector). By respecting the current limit set by the EVSE on the control pilot signal, the EV will not exceed the limits of the EVSE. Thus, the distributed energy management system, disclosed herein, can have the EVSE employ the control pilot signal when initiating adjustment or update of the charge rate offered to the EV.

FIG. 7 illustrates a flow diagram of an exemplary charge rate adjustment process 700 of a decision algorithm performed by an EVSE, such as the EVSE 140 of FIGS. 1 and 3, in accordance with a disclosed embodiment. The process 700 may be performed by the EVSE's controller in combination with other components of the EVSE, and is described below.

At reference 702, the EVSE initiates a charging transaction, e.g., a charging session, to charge a battery of an EV. The EVSE may set an initial charge rate offered to the EV at the beginning of the charging session. At reference 704, the EVSE receives (e.g., samples) a signal relating to a present current capacity utilization of the shared circuit, which supplies power to multiple loads, such as an array of EVSEs including the EVSE. The signal may include data, such as a 1-bit signal (e.g., 0 or 1 signal, or low or high signal), which indicates an availability or unavailability of current capacity on the shared circuit. As previously discussed, the signal may be transmitted from a remote capacity evaluator (e.g., 120 or 320 such as shown in FIGS. 1 and 3, respectively). The signal may be a unidirectional communication signal that is supplied to each of the EVSEs in the array, and received via the communication device of the EVSE.

At reference 706, the EVSE determines whether current capacity is available on the shared circuit based on the present current capacity utilization as indicated by the received signal. If current capacity is available, the EVSE outputs a decision to initiate update by increasing the charge rate offered to the EV, at reference 708. Otherwise, if current capacity is unavailable, the EVSE outputs a decision to initiate update by decreasing the charge rate offered to the EV, at reference 710. Depending on the type of EVSE and battery charging unit, the EVSE may initiate update via a control pilot signal, such as set forth in the Standard SAE J1772, to inform the charging unit of the EV (e.g., an AC Level 1 or 2 charging unit) to increase or decrease the charge rate accordingly. If the EVSE is configured to directly control charging of the battery of the EV, such as in Level 3 or DC fast charge, then the EVSE may initiate update locally at the EVSE and adjust the charge rate.

In either case, the EVSE then delays reiteration of operations of the charge rate adjustment process according to an update interval, e.g., a delay interval or period, at reference 712. Thereafter, the process 700 returns back to reference 704 where the EVSE again receives (e.g., samples) the signal of the present current capacity utilization and performs the operations as set forth in references 706 through 712 accordingly. The process 700 is continued until the charging session is completed or terminated.

When managing capacity utilization near to the installed system capacity, the distributed energy management systems and method, as disclosed herein, may take advantage of the time delay response of upstream protective devices, including circuit breakers. The time delay response allows system consumption to temporarily exceed the trip setting of the circuit breaker at the load center (e.g., a load center 130 of FIG. 1). For a small load excess, the time delay can be many seconds, or even minutes. Therefore, the process 700 can be executed periodically, on the order of seconds, to reduce the EV charging load with respect to the capacity of the system. The comparison threshold, such as employed by the capacity evaluator (e.g., 120 and 320 of FIGS. 1 and 3, respectively), can also be set to a nominal system load below full utilization, for example 90% of the capacity, to provide an additional buffer for the response time required by the distributed energy management system.

The update interval at which the decision algorithm is implemented by each EVSE operates as one parameter, which can be adjusted in the distributed energy management system depending on the specific installation. For example, decreasing the update interval decreases the system response time to under-utilization (e.g., when capacity is available) or over-utilization (e.g., when capacity is unavailable). Further, to achieve energy management in installations with multiple EVSEs, the decision algorithm can operate at a variable update interval, e.g., a variable delay interval or period. The use of a variable update interval addresses instability that may arise when multiple EVSEs respond simultaneously in the same manner to current capacity availability or unavailability on the system. The variable update interval also increases the likelihood that the order of execution of the decision algorithm, e.g., the operations of the charge rate adjustment process, between the EVSEs will differ or change, thereby preventing starvation of or monopolization by an individual EVSE. Examples of a fixed update interval scenario and a variable update interval scenario are shown in FIGS. 8 and 9, respectively, and discussed below.

Figure 8:
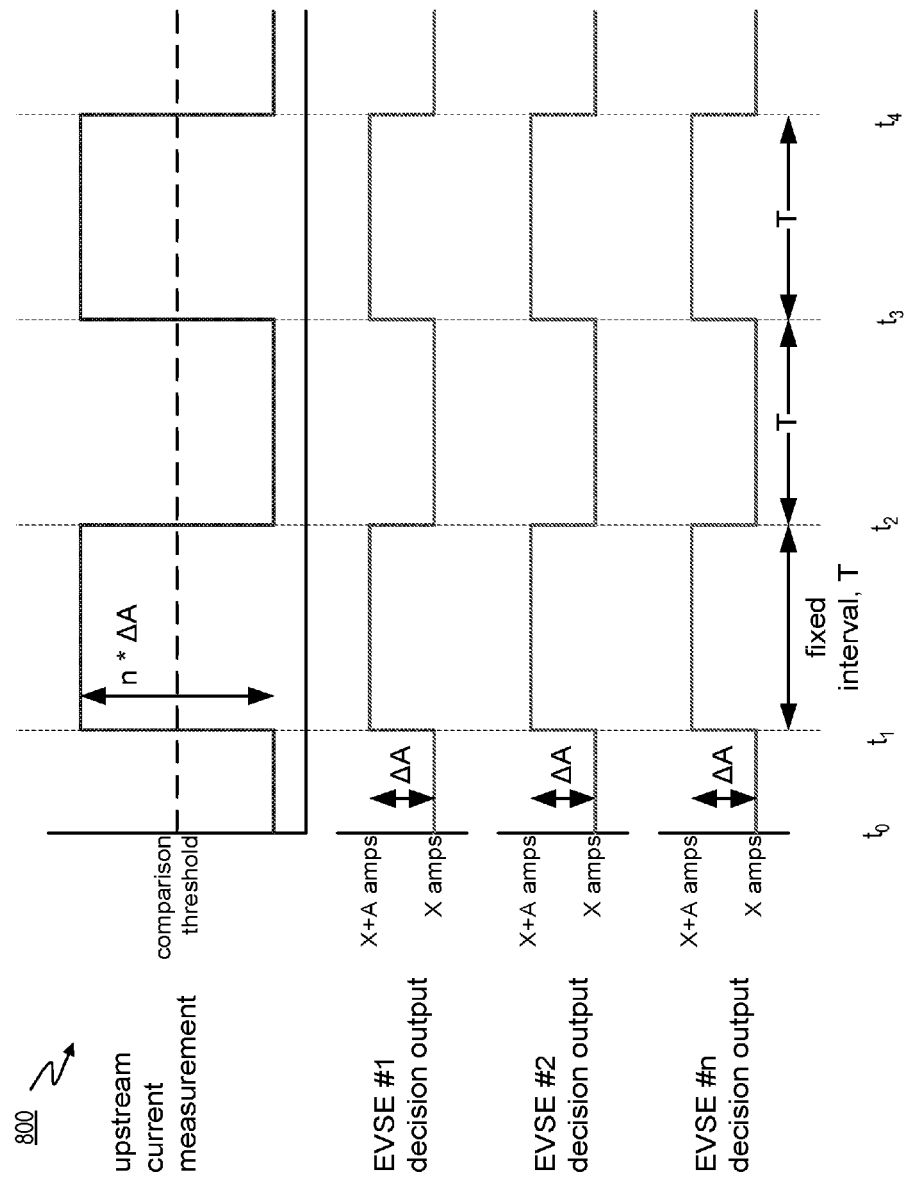
FIG. 8 illustrates an example of a charging scenario for an array of EVSEs in which the EVSEs initiate charge rate adjustments at the same time or at preset times.
Figure 9:
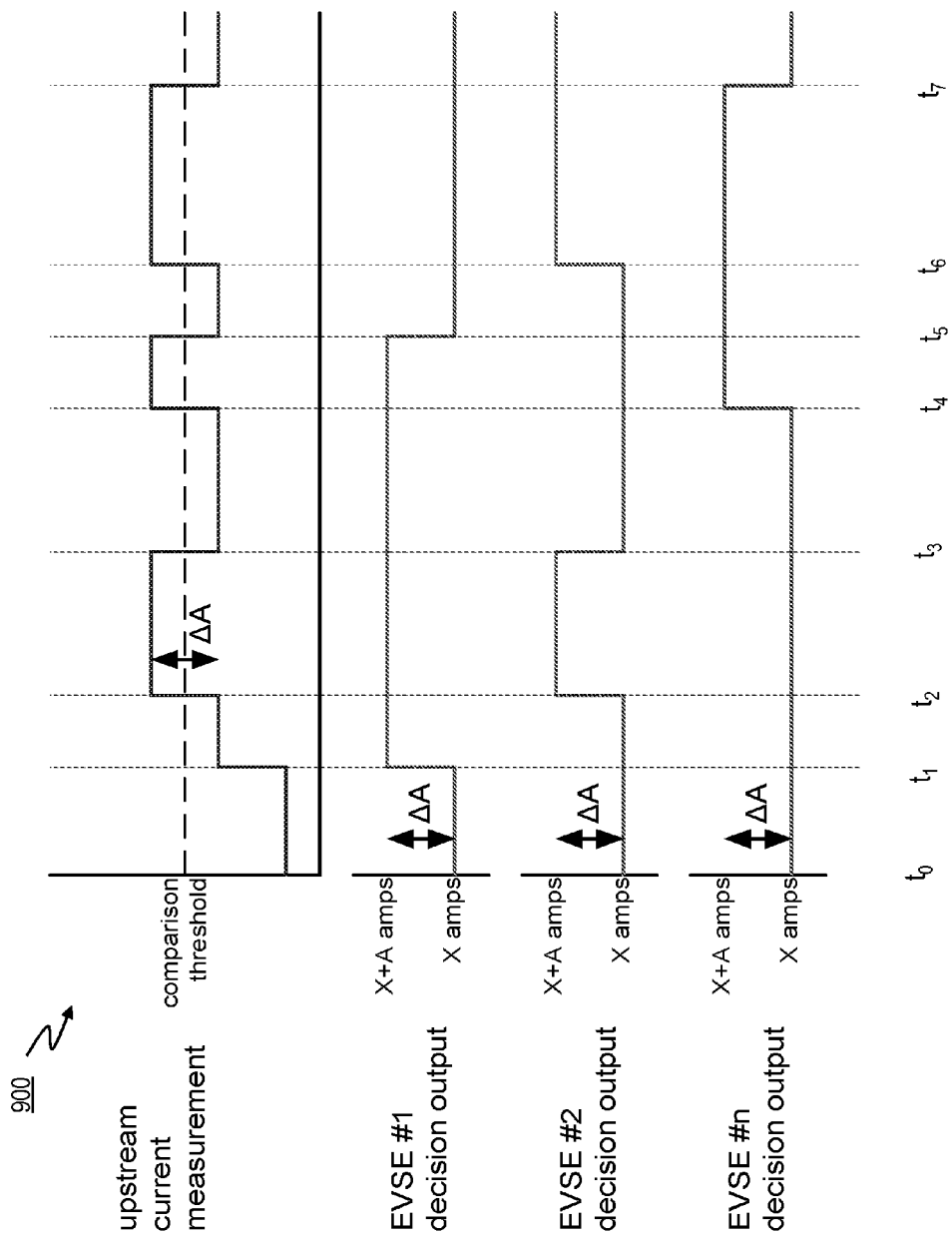
FIG. 9 illustrates an example of a charging scenario for an array of EVSEs in which each EVSE initiates its charge adjustment procedure according to a variable update interval, such as a random delay interval or period.

FIG. 8 illustrates an example of a charging scenario 800 for an array of EVSEs in which the EVSEs initiate charge rate adjustments at the same time or at preset times, such as when employing a fixed update interval (which may include a zero second delay). As shown in FIG. 8, multiple EVSEs simultaneously implement a charge rate adjustment, such as an increase in their charge rate at a time $t_1$, in response to a signal, such as from a capacity evaluator, indicating available capacity on the system (e.g., a comparison between the upstream current measurement and a comparison threshold) during the time period between $t_0$ and $t_1$. As a consequence, the current utilization by the EVSEs increases by the number of EVSEs (n) multiplied by a step size change in the charge rate ($\Delta A$), resulting in a significant upward spike (e.g., $n^*\Delta A$) in current utilization on the system beyond the capacity utilization threshold during the time period between $t_1$ and $t_2$. Thereafter, the EVSEs are informed of an unavailability of current capacity, which results in each of the EVSEs simultaneously decreasing their charge rates by the step size change ($-\Delta A$), resulting in a significant downward spike (e.g., $-n^*\Delta A$) in current utilization on the system below the capacity utilization threshold between the time periods $t_2$ and $t_3$. Accordingly, in this scenario, the energy management system operates in an inefficient and unstable manner, with a steady state fluctuation in the system capacity around the threshold equal to the product of the number of EVSEs (n) and the step size change in the charge rate ($\Delta A$).

To address potential instability and other problems that may arise when EVSEs simultaneously update their charge rate in the same manner, each of the EVSEs in the array may generate and employ a variable update interval to increase the likelihood that the EVSEs will implement their decision algorithm to adjust their charge rate at different times from each other. The variable update interval may be a randomly generated time period, which is used by the EVSE to define a delay interval before initiating charge rate adjustment operations. For example, FIG. 9 illustrates an exemplary charging scenario 900 for an array of EVSEs in which each EVSE initiates charge rate adjustment after a variable update interval. For example, each EVSE implements their decision algorithm at different times when using a variable update interval. As shown in FIG. 9, EVSE # 1 performs the charge rate adjustment operations at a time $t_1$. EVSE # 2 performs the charge rate adjustment operations at a time $t_2$. EVSE #n performs the charge rate adjustment operation at a time $t_4$. Accordingly, through the use of a variable update interval at each EVSE in the array, the steady state fluctuation of the system capacity around the threshold can be reduced, for example, to the step size change in the charge rate ($\Delta A$), independent of the number of EVSEs in the installation.

FIG. 10 illustrates a flow diagram of an exemplary charge rate adjustment procedure 1000 of a decision algorithm performed by an EVSE (e.g., EVSE 140 of FIGS. 1 and 3), which employs a variable update interval to delay charge rate adjustment operations, in accordance with an embodiment. The process 1000 may be performed by the EVSE's controller in combination with other components of the EVSE, and is described below as follows.

The operations as set forth in references 1002 through 1010 are the same as those described in references 702 through 710 of FIG. 7, respectively (discussed above). For example, at reference 1002, the EVSE initiates a charging transaction, e.g., a charging session, to facilitate charging of a battery of an EV. At reference 1004, the EVSE receives (e.g., samples) a signal relating to a present current capacity of the shared circuit, which supplies power to multiple loads, such as an array of EVSEs including the EVSE. At reference 1006, the EVSE determines whether current capacity is available on the shared circuit based on the present current capacity as indicated by the received signal. If current capacity is available, the EVSE outputs a decision to initiate update by increasing the charge rate offered to the charging EV, at reference 1008. Otherwise, if current capacity is unavailable, the EVSE outputs a decision to initiate update by decreasing the charge rate offered to the charging EV, at reference 1010.

In either case, the EVSE then delays implementation of the adjustment processes according to a variable update interval. For example, at reference 1012, the EVSE generates a variable update interval, such as using the following function: 40*(0.5+random [0,1]) seconds, where random [0,1] is a random number generator that generates a random value between and including 0 and 1. In this example, the function generates a random time value for the variable update interval between 20 seconds and 60 seconds, and can be modified as desired by changing the constants (e.g., 40 and 0.5) to obtain any desired time range. At reference 1014, the EVSE is delayed for a variable time interval or period corresponding to the generated variable update interval.

Thereafter, the process 1000 returns to reference 1004 where the EVSE again receives the signal of the present current capacity and performs the operations as set forth in references 1006 through 1012 accordingly. The process 1000 is continued until the charging session is completed or terminated.

FIG. 11 illustrates a flow diagram of an exemplary charge rate adjustment process 1100 for an EVSE which employs a variable delay and additional adjustment parameters, in accordance with another embodiment. The process 1100 may be performed by the EVSE's controller in combination with other components of the EVSE. In this example, certain operations of the process 1100 are identified as being performed by supervisory functions or the decision algorithm. Supervisory functions can be those functions that require control of other components in the EVSE (e.g., the communication device, memory, etc.) or involve primary control operations of the EVSE. Decision type algorithms can be processes initiated by a supervisory function to provide a result, which is then used by the supervisory functions in the performance of its duties.

At reference 1102, the EVSE through the supervisory functions initiates a charging transaction, e.g., a charging session, and begins implementing the operations of the decision algorithm. The EVSE receives a signal relating to a present current capacity of the shared circuit. As previously discussed, the present current capacity may be determined by a capacity evaluator, such as shown in FIGS. 1 and 3. The capacity evaluator compares one or more current measurements to a fixed or variable capacity utilization threshold(s), such as a system capacity utilization threshold (e.g., 90% of the upstream wiring protection device rating) and/or a target capacity utilization threshold (e.g., optimized billing rate since rates change according to usage and other factors). For example, at reference 1150, the EVSE polls a threshold comparison output, which is obtained under control of the supervisory function through the signal received via a communication device at reference 1104. The received signal, such as from the capacity evaluator, may reflect a system capacity utilization threshold comparison at reference 1106 and/or target capacity utilization threshold (also referred to as "utilization target threshold") comparison at reference 1108.

At reference 1152, the EVSE generates a random value (also referred to as a "decision seed") for comparison to a probability for increasing or decreasing the charge rate offered to the EV. In this example, the random value is a value between and including 0 and 1, which is generated using a random number generator generally referred to as random [0,1].

At reference 1154, the EVSE calculates the probability to increase or decrease the charge rate offered to the charging EV. The probability may be adjusted or weighted according to probability adjustment parameters, such as charging transaction data (e.g., charging duration or charge amount drawn) at reference 1110, priority data (e.g., high priority or low priority customer) at reference 1112 and/or a charge rate of the EV (e.g., the present charge rate in relation to an initial charge rate at the beginning of the charging session) at reference 1114, or other parameters. These parameters can be weighted in the probability calculation, and provided through a supervisory function or through user input via a user interface at the EVSE. The charge rate data may instead be determined as part of the decision algorithm based on the history of charge rate changes from the initial charge rate used to begin charging.

As previously discussed, the adjustment parameters may be used to adjust the probability of increasing or decreasing the charge rate. For example, the relationship of the present charge rate in comparison to the initial charge rate can be used as one parameter. If the present charge rate is below the initial charge rate, the probability for increasing the charge rate is increased when capacity is available. If the present charge rate is below the initial charge rate, the probability for decreasing the charge rate is decreased when capacity is unavailable. The supervisory functions may provide the decision algorithm with the present charge rate of the EVSE or the charging EV. Alternatively, the decision algorithm can internally track the present charge rate based on a history of the decision algorithm output, such as by counting the number of increase and decrease decisions made for a particular charging instance. The decision algorithm can also use information of the actual charge rate drawn by the EV as input to determine the probability of changing the charge rate.

Furthermore, the initial charge rate offered to a charging EV may also be adjustable or variable. For example, when an EV is initially connected to the EVSE to start a charging session, the EVSE can offer an initial charge rate lower than its maximum charging rate, and subsequently adjust the charge rate offered at each decision algorithm update interval. The initial charge rate offer parameter can be adjusted based on potential capacity over-utilization. As the system capacity approaches the potential demand from all installed EVSEs (if operated simultaneously at full charging rate), the initial charge rate can be increased to approach the maximum charging rate. For a system with a low ratio of system capacity to maximum potential demand, the initial charging rate parameter can be lowered. Adjusting this parameter allows optimizing the number of decision algorithm update intervals required to reach the nominal capacity utilization. The initial charge rate parameter also allows the energy management system to be designed to inherently skew higher charge rates to a more recently charging EV by offering higher initial charge rates, or to EVs which have been charging for longer durations by offering low initial charge rates.

Another adjustment parameter is priority of the EVSE (or its charging EV or user). The probability for increasing the charge rate may have a direct relationship to the priority of the charging EV. For example, a paying customer can be assigned a higher priority, and thus, has a higher chance of having the charge rate increased when capacity is available on the system. The probability for decreasing the charge rate can have an inverse relationship to the priority of the charging EV. For example, an EVSE with a higher priority has a decreased probability that the charge rate offered to the EV will be decreased when capacity is unavailable on the system. In this scenario, the EVSEs with a lower priority have a higher probability of having their charge rate decreased. Information about charging prioritization can come from the EVSE supervisory functions or from a user interface, e.g., a human machine interface (HMI) system on the EVSE.

Furthermore, other adjustment parameters can be based on charging transaction data for an EVSE (or its charging EV). The EVSE can use the charging transaction data of the EV to obtain information on charging transaction factors, such as the charge duration or charged amount (e.g., energy drawn) of the EV during the charging session. The probability for increasing the charge rate can have an inverse relationship to the charge duration or charged amount of the EV, and the probability for decreasing the charge rate can have a direct relationship to the charge duration or charged amount of the EV. In addition, the charge duration can be measured, via a timer or counter, as part of the decision algorithm or provided by the EVSE supervisory functions. The charged amount can also be measured as part of the decision algorithm, or provided by the EVSE supervisory functions. The charged amount can be calculated, for example, as the charge rate multiplied by the time duration ($\Delta t$). Where the charge rate changes over the charging session, the total charge amount is: charge rate$_1$* $\Delta t_1$ + . . . +charge rate$_m$*$\Delta t_{1m}$, where m is the number of different periods and their different charge rates).

Examples of a weighted probability curves for a present charge rate in relation to the initial charge rate are shown in FIGS. 12A and 12B, for priority data are shown in FIGS.

Figure 14A:
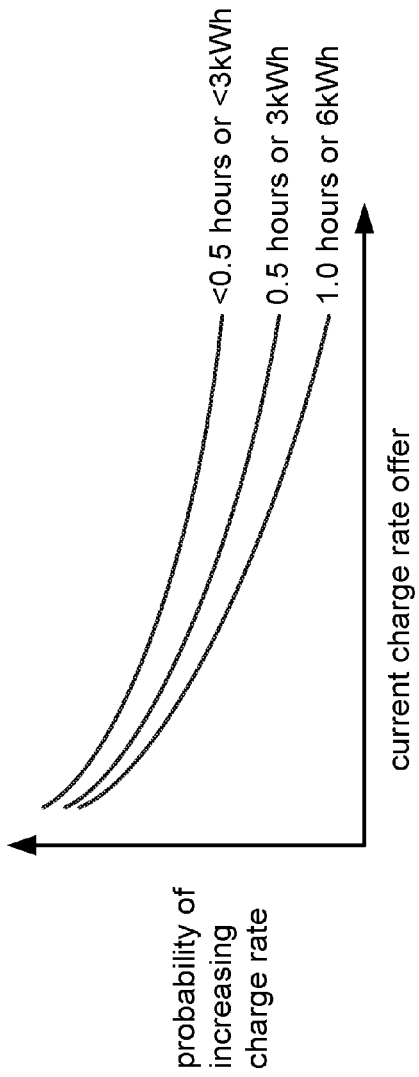
FIGS. 14A and 14B illustrate weighted probability curves for increasing or decreasing, respectively, a charge rate according to charge transaction factors, such as a charging duration of the EVSE (or its charging EV) or an amount of energy already drawn by the EVSE (or its charging EV).
Figure 14B:
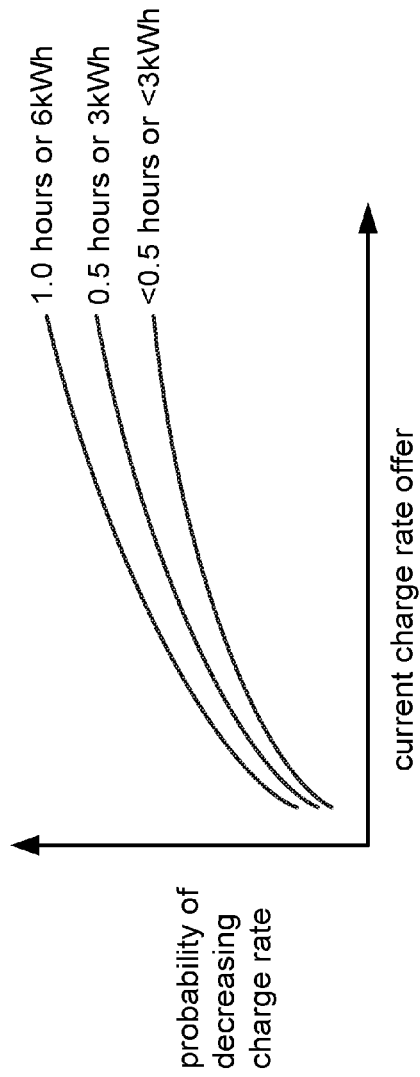

13A and 13B and for charge transaction data are shown in FIGS. 14A and 14B. The weighted probability curves for the adjustment parameters can be used to adjust the probability of whether to increase or decrease a charge rate offered to an EV.

After the probability is calculated at reference 1154, the process 1100 proceeds to reference 1156 where the EVSE determines whether current capacity is available (e.g., available system capacity and/or available target capacity utilization). If current capacity is available, the EVSE compares the generated random value (e.g., the decision seed) to the probability for increasing the charge rate to determine if the probability has been satisfied or not, at reference 1158. For example, if the random value is less than or equal to the probability, then the EVSE does not increase the charge rate offered to the EV. Otherwise, if the random value is greater than the probability, then the EVSE outputs a decision to increase the charge rate offered to the EV, at reference 1160. The supervisory functions of the EVSE thereafter perform the decision output by causing the charge rate to increase, at reference 1116. For example, as previously discussed, the EVSE can initiate charge rate increase through the control pilot signal.

If current capacity is unavailable, the EVSE compares the generated random value (e.g., the seed) to the probability for decreasing the charge rate to determine if the probability has been satisfied or not, at reference 1162. For example, if the random value is less than or equal to the probability, then the EVSE does not decrease the charge rate offered to the EV. Otherwise, if the random value is greater than the probability, then the EVSE outputs a decision to decrease the charge rate offered to the EV, at reference 1164. The supervisory functions thereafter perform the decision output by causing the charge rate to decrease, at reference 1166. For example, as previously discussed, the EVSE can also initiate charge rate decrease through the control pilot signal.

Irrespective of whether the probability for increasing or decreasing the charge rate is satisfied, the EVSE thereafter generates a variable update interval (e.g., where the variable update interval=40*(0.5+random [0,1]) seconds), at reference 1166. At reference 1168, the EVSE delays implementing the decision algorithm or operations thereof according to the variable update interval. After the variable delay, the process 1100 returns to reference 1150 to receive (e.g., sample) the signal relating to the present capacity of the system. The process 1100 is continued until the charging session is completed or terminated.

FIGS. 12A and 12B illustrate weighted probability curves for increasing or decreasing a charge rate according to the present charge rate in relation to an initial charge rate offered to a charging EV at the beginning of the charging session. As previously discussed, weighting the probability of charge rate adjustment can assist in equalizing the load sharing among a plurality of installed EVSEs, and thus, reduce the occurrence of reaching system stability with extreme differences between the minimum and maximum charging rates offered by different EVSEs to their charging EVs. As a result, the distributed energy management system can reduce both monopolization and starvation of a subset of the charging EVs being charged. For example, as shown in FIG. 12A, the probability of increasing the charge rate is higher when current capacity is available (e.g., under-utilization of system capacity) if the present charge rate is below the initial charge rate, and is lower if the present charge rate is above the initial charge rate. As shown in FIG. 12B, the probability of decreasing the charge rate is lower when current capacity is unavailable (e.g., over-utilization of system capacity) if the present charge rate is below the initial charge rate, and is higher if the present charge rate is above the initial charge rate.

FIGS. 13A and 13B illustrate probability curves for increasing or decreasing a charge rate, respectively, according to a priority of the EVSE (or its charging EV). For example, the energy management system can offer paid or free charging (e.g., public) through the EVSEs. A charging customer can pay a premium for an increased charging priority (e.g., a high priority) at the EVSE when initiating the charging transaction. On the other hand, a non-paying customer is assigned a lower charging priority (e.g., a low priority). As shown in FIG. 13A, a higher priority EVSE can be provided with a higher probability of having its charge rate increased when capacity is available as compared to a lower priority EVSE. As shown in FIG. 13B, a higher priority EVSE can be provided with a lower probability of having its charge rate decreased when capacity is unavailable as compared to a lower priority EVSE. In addition to a fee-based priority factor, other priority-related factors may also be used to determine a priority level of the EVSE, such as a user loyalty program, model or brand of the electric vehicle (EV), or other preferential factors related to the EV or charging customer.

FIGS. 14A and 14B illustrate probability curves for increasing or decreasing a charge rate, respectively, according to charging transaction factors, such as a charging duration of the EVSE (or its charging EV) or an amount of energy already drawn by the EVSE (or its charging EV) during a charging session. As shown in FIG. 14A, the probability of increasing a charge rate offered to the EV decreases for higher charge duration or charged amount (e.g., energy drawn) by the EV, and increases for lower charge duration or charged amount by the EV. For example, an EV that recently initiated a charging session or has drawn a relatively small amount of energy may be provided with a higher probability for increasing its charge rate when capacity is available. In FIG. 14B, the probability of decreasing a charge rate offered to the EV increases for higher charge duration or charged amount by the EV, and decreases for lower charge duration or charged amount by the EV. For example, an EV that has been charging for a relatively long time or has drawn a relatively large amount of energy has a higher probability of having its charge rate decreased when capacity is unavailable. As with the present charge rate parameter (discussed above), charging transaction data can be used to equalize charging usage between a plurality of EVSE (and their charging EVs).

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

The invention claimed is:

1. A distributed energy management system for managing a charge rate of an array of electric vehicle supply equipment (EVSE) which are supplied power from a common power source through a shared circuit, comprising:
    a capacity evaluator located remotely from each of the EVSEs in the array, the capacity evaluator comprising:
        a sensor for measuring a current at a branch origin of the shared circuit, the current reflecting the current drawn by all loads including the array of EVSEs on the shared circuit, a threshold comparator for comparing the measured current to a capacity utilization threshold for the shared circuit to determine a present current capacity utilization of the shared circuit, and a communication device for transmitting a signal relating to the present current capacity utilization; and the array of EVSEs on the shared circuit, each of the EVSEs comprising:

a communication device for receiving the signal from the capacity evaluator, and a controller configured to:

generate a variable update interval, and initiate adjustment of the charge rate of the EVSE according to the variable update interval based on the present current capacity utilization of the shared circuit.

2. The system of claim 1, wherein the controller initiates adjustment of the charge rate after a variable delay defined by the generated variable update interval.

3. The system of claim 1, wherein the present current capacity utilization reflects an availability or unavailability of current capacity on the shared circuit.

4. The system of claim 1, wherein the capacity evaluator further comprises:

a site current sensor for measuring a site current at a location upstream of the branch origin, the site current reflecting a total current drawn by all loads at a site that includes a plurality of branch circuits, one of the branch circuits including the shared circuit through which power is supplied to the array of EVSEs, wherein the threshold comparator comprises:

a first comparator configured to perform a first comparison between the measured current at the branch origin and a capacity threshold for the shared circuit to determine an availability or unavailability of current capacity of the shared circuit; and a second comparator configured to perform a second comparison between the site current and a current capacity utilization threshold for the site to determine an availability or unavailability of current capacity of the site; and a logic circuit configured to output the present current capacity utilization based on the output from the first and second comparators.

5. The system of claim 1, wherein, to initiate adjustment, the controller is configured to:

determine whether to increase or decrease the charge rate of the EVSE based on the present current capacity utilization of the shared circuit and one of a charge rate priority of the EVSE, a present charge rate of the EVSE in relation to an initial charge rate of the EVSE, a present charging duration of the EVSE or an amount of energy already drawn by the EVSE; and initiate increase or decrease of the charge rate of the EVSE according to the determination.

6. The system of claim 5, wherein to determine, the controller is configured to adjust a probability on whether to increase or decrease the charge rate of the EVSE according to one of a charge rate priority of the EVSE, a present charge rate of the EVSE in relation to an initial charge rate of the EVSE, a present charging duration of the EVSE or an amount of energy already drawn by the EVSE.

7. The system of claim 6, wherein to adjust, the controller is configured:

to generate a random value to compare against a probability for increasing or decreasing a charge rate;

to determine the probability of increasing or decreasing the charge rate, the probability being weighted according to one of a charge rate priority of the EVSE, a present charge rate of the EVSE in relation to an initial charge rate of the EVSE, a present charging duration of the EVSE or an amount of energy already drawn by the EVSE; and to compare the random value to the probability to determine whether the probability has been satisfied to increase or decrease the charge rate of the EVSE.

8. The system of claim 1, wherein to initiate, the controller is configured to control an Electric Vehicle (EV) to adjust the charge rate of a battery of the EV via a control pilot signal.

9. The system of claim 1, wherein the controller is configured to repeat generating and initiating operations until a charging session is completed or terminated.

10. An electric vehicle supply equipment (EVSE) for managing a charge rate at which power is supplied to charge a battery of an electric vehicle (EV), comprising:

a communication device configured to receive a signal relating to a present current capacity utilization of a shared circuit that is configured to provide power to a plurality of loads including the EVSE and an other EVSE; and a controller configured to:

generate a variable update interval; and initiate adjustment of the charge rate of the EVSE according to the variable update interval based on the present current capacity utilization of the circuit.

11. The system of claim 10, wherein the controller initiates adjustment of the charge rate after a variable delay defined by the generated variable update interval.

12. The EVSE of claim 10, wherein the charge rate of the EVSE is increased if the signal indicates available current capacity on the shared circuit or is decreased if the signal indicates unavailable current capacity on the shared circuit.

13. The EVSE of claim 10, wherein, to initiate adjustment, the controller is configured:

to determine whether to increase or decrease the charge rate of the EVSE based on the present current capacity utilization of the shared circuit and one of a charge rate priority of the EVSE, a present charge rate of the EVSE in relation to an initial charge rate of the EVSE, a present charging duration of the EVSE or an amount of energy already drawn by the EVSE; and to initiate increase or decrease of the charge rate of the EVSE according to the determination.

14. The system of claim 13, wherein to determine, the controller is configured to adjust a probability on whether to increase or decrease the charge rate of the EVSE according to one of a charge rate priority of the EVSE, a present charge rate of the EVSE in relation to an initial charge rate of the EVSE, a present charging duration of the EVSE or an amount of energy already drawn by the EVSE.

15. The EVSE of claim 14, wherein to adjust, the controller is configured:

to generate a random value to compare against a probability for increasing or decreasing a charge rate;

to determine the probability of increasing or decreasing the charge rate, the probability being weighted according to one of a charge rate priority of the EVSE, a present charge rate of the EVSE in relation to an initial charge rate of the EVSE, a present charging duration of the EVSE or an amount of energy already drawn by the EVSE; and to compare the random value to the probability to determine whether the probability has been satisfied to increase or decrease the charge rate of the EVSE.

16. The EVSE of claim 10, wherein to initiate, the controller is configured to control an Electric Vehicle (EV) to adjust the charge rate of a battery of the EV via a control pilot signal.

17. The EVSE of claim 10, wherein the controller is configured to repeat generating and initiating operations until a charging session is completed or terminated.

18. The EVSE of claim 10, wherein, to initiate adjustment, the controller is configured to determine whether to increase or decrease the charge rate of the EVSE based on the present current capacity utilization of the shared circuit and a probability curve of an adjustment parameter.

* * * * *